Feb. 24, 1959     L. E. MATTHEWS ET AL     2,874,826
SHOCK AND VIBRATION ISOLATION DEVICE
Filed June 22, 1956

INVENTORS
LYLE E. MATTHEWS
E. QUIMBY SMITH JR.
BY
ATTORNEYS

United States Patent Office 2,874,826
Patented Feb. 24, 1959

2,874,826

SHOCK AND VIBRATION ISOLATION DEVICE

Lyle E. Matthews and E Quimby Smith, Jr., Oxnard, Calif.

Application June 22, 1956, Serial No. 593,302

2 Claims. (Cl. 206—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel shock and vibration isolation device and more particularly to a shock and vibration device comprising a hollow inflatable body means provided with a plurality of interconnected chambers having a gas under pressure therein whereby the gas is metered between the chambers during operation of the device to effectively isolate shocks and vibrations from an object supported by the device.

The present invention may be utilized in any application wherein it is desired to support an object such that it is effectively isolated from any shocks or vibrations occurring in its environment. The protection of fragile items during shipment by public transportation has presented a problem for many years, but this problem has been considerably increased with the present day requirement for the shipment of very expensive items such as guided missiles containing extremely delicate instruments and equipment therein. The present invention is especially adapted for use in shipping a cylindrical object such as a guided missile wherein it is necessary to protect the transported object from possible damage which might be incurred due to accidental dropping or careless handling during shipment.

Various containers have been designed for the purpose of shipping guided missiles, the most commonly employed being either the type employing rubberized hair as a cushioning material or utilizing steel coil springs between the shell of the container and the missile. In devices of the first type, a cushion of rubberized hair is first wrapped around the missile and the assembly is subsequently installed within a steel shell. This type of arrangement is very difficult to assemble since it is necessary to employ either an overhead crane or the labor of four men to insert the rubberized hair cushion and the missile within its associated steel shell. Devices employing steel coil springs between the missile and an outer steel shell are also provided with rubber shock cords and friction dampers in order to provide adequate protection for the transported objects. Such systems are complex and bulky in addition to being excessively expensive and heavy in construction.

The present invention comprises a hollow resilient body means having a plurality of chambers formed therein. Adjacent chambers are provided with openings which provide communication between the chambers and a gas under pressure is disposed within each of the chambers. The body means is adapted to be wrapped around an object such as a guided missile and upon subjection to shock or vibration, the gas within the body means passes through the openings thereby traveling from one chamber to another, and the openings provide a metering effect which attenuates any shocks or vibrations thereby protecting the fragile components of an object supported by the device. The invention device may be inserted within a shipping container or the like in a deflated or partially inflated condition and subsequently be inflated, thereby considerably decreasing the effort required to assemble it as compared to prior art devices. Since the body means of the present invention may be formed of a rubberized fabric or the like, it is lighter and cheaper in construction than prior art devices.

An object of the invention is to provide a new and novel shock and vibration isolation device which effectively isolates an object supported thereby from shocks and vibrations from any direction which may occur in the surrounding environment.

Another object is to provide a shock and vibration isolation device which is extremely easy to assemble.

A further object of the invention is the provision of a shock and vibration isolation device which is light and inexpensive in construction, yet sturdy and efficient in operation.

Other objects and many of the attendant advantages of this invention will be readily appreciated as the same becomes better understood by reference to the following detailed description when considered in connection with the accompanying drawings wherein.

Figure 1:
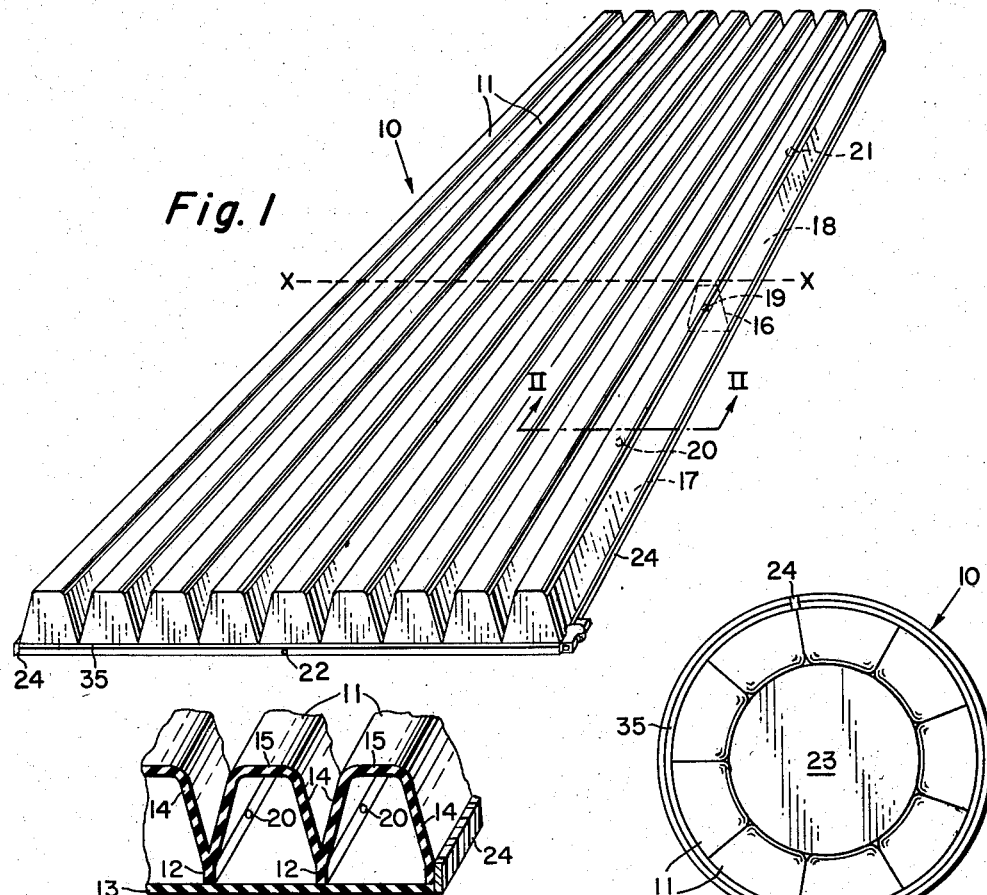
Fig. 1 is a perspective view of the body means of the present invention.
Figure 2:
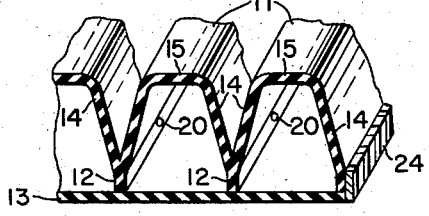
Fig. 2 is an enlarged view taken along line II—II of Fig. 1 looking in the direction of the arrows.

Referring now to the drawings wherein like reference characters designate similar parts throughout the several views, there is shown in Fig. 1 a body means indicated generally by reference numeral 10, the body means being formed of a resilient inflatable material such as rubberized fabric which is adapted to hold a gas under pressure therein. The body means is divided into a plurality of longitudinally extending bolster members or air cells 11, and as seen more particularly in Fig. 2 each of the bolster members is identical in configuration and adjacent bolster members have common lateral walls 12 disposed therebetween. It should be noted that the bottom portion of each of walls 12 is suitably secured as by bonding to the flattened base member 13 and that the upper walls 14 of each of the bolster members taper upwardly to the upper wall 15 of each of the bolster members. Each of the bolster members is provided with a laterally extending partition 16 which divides each bolster member into two chambers 17 and 18. An opening 19 is provided through each of partitions 16 thereby providing communication between chambers 17 and 18 of each of the bolster members.

Openings 20 and 21 are also provided in the common walls 12 of each of the bolster members between adjacent chambers 17 or 18 respectively, thereby also providing communication between each of the adjacent chambers through the lateral walls 12 of the bolster members.

A conventional filler valve 22 which may be of any reliable type such as a tire valve is provided within one end wall of the body means for inflating the body means. A suitable gas such as air may be introduced through valve 22, and suitable pressure may be built up within the body means as desired, although it is considered that a pressure of 2 p. s. i. is sufficient to enable the device to operate efficiently. It is evident that each of the chambers of the body means is interconnected through the intermediary of openings 19, 20 and 21, and accordingly the entire body means may be inflated by introducing a gas under pressure through valve 22.

Figure 3:
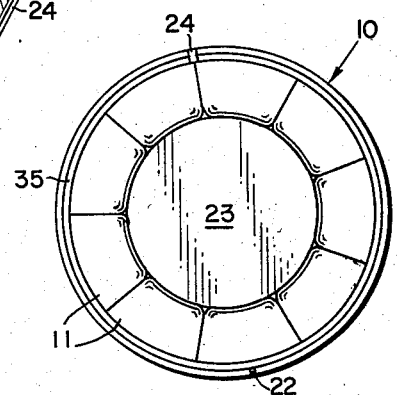
Fig. 3 is a view of the device shown in Fig. 1 in assembled position about a fragile object.
Figure 4:
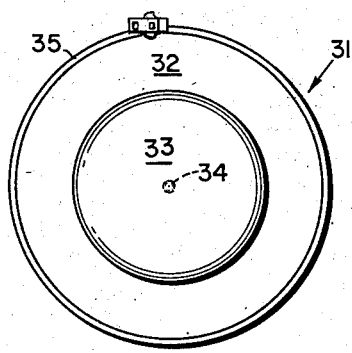
Fig. 4 is a front view of an end closure member utilized with the body means shown in Figs. 1 and 3.
Figure 5:
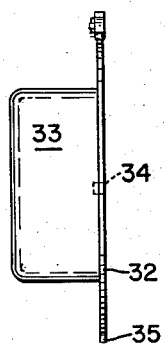
Fig. 5 is a side view of the member shown in Fig. 4.

Fig. 3 illustrates the body means of the present invention in operative position about a cylindrical object 23 such as a guided missile or the like. It is apparent that when in operative position the tapered configuration of each of the bolster members enables the body means to be wrapped into a solid cylindrical form such that a continuous peripheral surface is provided on the inner and outer surfaces of the body means in this position. Suitable means such as a conventional zipper 24 having the cooperating portions thereof secured to the opposite lateral walls of the body means is provided whereby the body means may be secured in the position as shown in Fig. 3.

It is evident that in the position as shown in Fig. 3, the invention device will protect supported object 23 from vibrations or shocks occurring substantially normal to the longitudinal axis therein. However, it is also necessary to protect the supported object adjacent the ends thereof in the event that the device may be accidentally dropped on the end thereof. In order to accomplish this, body means 10 is provided with sufficient longitudinal dimensions such that it projects longitudinally beyond the opposite ends of the supported object. End closure members indicated generally by reference numeral 31 comprise a relatively rigid circular disk member 32 having a hollow resilient plug portion 33 suitably secured thereto as by bonding. Member 33 is formed of a material similar to that of the body means and is adapted to be inflated by a gas under pressure through a valve 34 in a manner similar to that in which the body means is inflated. Plug portion 33 is of such a diameter that it may be inserted snugly within that portion of the body means which projects longitudinally beyond the supported object, and in this manner the supported object is surrounded on all sides by a pneumatic cushion. A conventional zipper 35 having the cooperating portions thereof secured to opposite end walls of the body means and on the outer periphery of end closure members 31 is employed for securing the end closure means in position relative to the body means.

In order to assemble the present invention, the body means is wrapped around a guided missile or the like and may be partially inflated if desired, whereupon it is inserted into a steel cylinder or similar shipping container. The body means is subsequently inflated such that it assumes the position shown in Fig. 3. Closure means 31 may then be inserted within the projecting end portions of the body means, or if desired, the closure means may be inserted within the body means just prior to final inflation thereof such that inflation of the body means serves to seal the inflated plug portion 33 of the closure means 31 within the body means. It is also apparent that the invention device may be wrapped around and secured about an object and the end closure means secured in place prior to installation in a shipping container. The device may then be partially inflated and inserted in the shipping container and subsequently fully inflated. It is evident that the assembly of the present invention having a fragile object therein within a shipping container is a very simple operation which may be performed easily by two men.

In operation, when the body means is subjected either to shocks or vibrations, the gas under pressure within the body means serves as a pneumatic cushion to effectively prevent the transmission of shocks to the supported object. In addition, openings 19, 20 and 21 which permit the flow of gas between the chambers of the body means serve to meter the flow of the gas such that vibrations of the body means are attenuated whereby the supported object will be isolated from vibrations of the shipping container. It is apparent that any shocks or vibrations which tend to cause the bolster members to oscillate about the longitudinal axis thereof will cause the gas within the body means either to flow from one of chambers 17 into an adjacent chamber 17, or from one of chambers 18 into an adjacent chamber 18, such flow being metered through openings 20 or 21 respectively. The metering of gas flow through the openings will damp such oscillations thereby protecting the supported object.

Should the body means be subjected to shocks or vibrations which tend to cause the body means to oscillate about its lateral axis X—X as seen in Fig. 1, the gas within the body means will flow between chambers 17 and 18 through openings 19 in one or more of the bolster members. Each of openings 19 will serve to meter the flow of gas between chambers 17 and 18 such that this type of oscillation is also effectively attenuated.

It is evident that a plurality of partitions may be provided within each of the bolster members of the body means if desired and one or more openings may be provided through each of such partitions. In addition, more than one opening may be provided through lateral walls 12 of the bolster members if desired. The pressure of the gas within the body means and the size and number of partitions and openings provided within the partitions and the lateral walls of the body means may be chosen in accordance with well-known design considerations according to the particular environment from which the supported object is to be isolated.

As a safety factor, lower wall 13 of the body means may be provided with a thin layer of sponge rubber or similar material suitably secured to the inner surface thereof to act as a cushion in the eventuality that the device should become deflated during operation. This safety factor should not be necessary under ordinary circumstances however since very reliable fabric and valves are commercially available. It is apparent that wall 13 forms the outer surface of the body means when in operative condition as shown in Fig. 3, and since this outer surface may be subjected to rough treatment, wall 13 may be constructed so as to be thicker than the other walls of the body means or it may be suitably reinforced to increase its strength and wearing characteristics.

It is apparent from the foregoing that there is provided a new and novel shock and vibration isolation device which effectively isolates shocks and vibrations occurring in all directions. The device is extremely easy to assemble and is light and inexpensive in construction, yet sturdy and efficient in operation.

Obviously many modifications and variations of the present invention are possible in the light of the above teachings. It is therefore to be understood that within the scope of the appended claims the invention may be practiced otherwise than as specifically described.

We claim:

1. A shock and vibration isolation container for supporting an elongate object to be protected which comprises a resilient open-ended, elongate tubular member formed by securing together opposite longitudinal edges of a panel, said member including a series of longitudinal juxtaposed inflatable cells, said cells having connecting wall portions therebetween, each of said walls having a plurality of opening for metering fluid flow therethrough, valve means for inflating said cells with a fluid under pressure, each cell having at least one transverse partition forming a plurality of chambers in tandem, said partition having at least one opening for metering fluid flow therethrough, an inflatable closure means for each open end of the member, and means detachably securing said closure means to the member, whereby oscillations of the object perpendicular to a longitudinal axis of the member will be dampened by the metered flow through the openings between said cells, oscillations of the body about a transverse axis will be dampened by the metered flow through the openings between said chambers, and oscillations of the body parallel to said longitudinal axis will be dampened by said closure members.

2. A shock and vibration isolation container for supporting an elongate object to be protected which comprises a resilient panel having opposite longitudinal edges, detachable means for securing together said sides and forming an open-ended, elongate tubular member capable of enclosing said object, said member including a series of longitudinal juxtaposed inflatable cells having tapered side walls, said cells having connecting wall portions therebetween, each of said walls having at least one opening for metering fluid flow therethrough, valve means for inflating said cells with a fluid under pressure, each cell having at least one transverse partition forming a plurality of chambers in tandem, said partition having at least one opening for metering fluid flow therethrough, an inflatable closure means for each open end of the member including a plug portion for extending into said tubular member and a peripheral portion engaging the adjacent ends of said member, and means detachably securing said peripheral portion of the closure means to the member, whereby oscillations of the object perpendicular to a longitudinal axis of the member will be dampened by the metered flow through the openings between said cells, oscillations of the body about a transverse axis will be dampened by the metered flow through the openings between said chambers, and oscillations of the body parallel to said longitudinal axis will be dampened by said closure members.

References Cited in the file of this patent

UNITED STATES PATENTS

| | | |
|---|---|---|
| 2,028,060 | Gilbert | Jan. 14, 1936 |
| 2,145,289 | Boudreaux | Jan. 31, 1939 |
| 2,363,249 | Hutchinson | Nov. 21, 1944 |
| 2,663,451 | Yarnall | Dec. 22, 1953 |
| 2,691,179 | Kann | Oct. 12, 1954 |
| 2,725,898 | Stansbury | Dec. 6, 1955 |
| 2,741,780 | Kimbrig | Apr. 17, 1956 |
| 2,748,401 | Winstead | June 5, 1956 |
| 2,774,503 | Moore | Dec. 18, 1956 |
| 2,804,911 | Howarth | Sept. 3, 1957 |